United States Patent [19]
Takasuka et al.

[11] Patent Number: 5,485,380
[45] Date of Patent: *Jan. 16, 1996

[54] COMBUSTION KNOCK DETECTION SYSTEM FOR INTERNAL COMBUSTION ENGINE

[75] Inventors: Yoshitaka Takasuka; Yasuyuki Kimura; Akira Kato, all of Saitama, Japan

[73] Assignee: Honda Giken Kogyo Kabushiki Kaisha, Tokyo, Japan

[ * ] The term of this patent shall not extend beyond the expiration date of Pat. No. 5,335,744.

[21] Appl. No.: 330,616

[22] Filed: Oct. 28, 1994

Related U.S. Application Data

[63] Continuation of Ser. No. 981,733, Nov. 25, 1992, abandoned.

[30] Foreign Application Priority Data

Nov. 29, 1991 [JP] Japan ................................. 3-340298

[51] Int. Cl.$^6$ .......................... B60T 8/32; F02P 5/14; G06F 17/00
[52] U.S. Cl. ...................... 364/426.03; 123/417; 180/197
[58] Field of Search ................... 364/431.08, 426.03, 364/426.02; 180/197; 123/416, 417, 422, 425

[56] References Cited

U.S. PATENT DOCUMENTS

| | | | |
|---|---|---|---|
| 4,710,881 | 12/1987 | Mouri et al. | 364/431.08 |
| 5,083,278 | 1/1992 | Matsuura | 364/431.08 |
| 5,088,044 | 2/1992 | Matsuura | 364/431.08 |
| 5,121,729 | 6/1992 | Hashimoto et al. | 364/431.08 |
| 5,164,902 | 11/1992 | Koppen et al. | 364/426.08 |
| 5,224,044 | 6/1993 | Tamura et al. | 364/431.08 |
| 5,238,081 | 8/1993 | Maeda et al. | 364/426.03 |
| 5,265,693 | 11/1993 | Rees et al. | 180/197 |
| 5,267,164 | 11/1993 | Miyama | 364/431.08 |
| 5,282,137 | 1/1994 | Suzuki et al. | 364/426.03 |
| 5,313,391 | 5/1994 | Sigl et al. | 364/426.03 |
| 5,325,300 | 6/1994 | Tsuyama et al. | 364/426.03 |
| 5,335,744 | 8/1994 | Takasuka et al. | 364/426.03 |

Primary Examiner—Kevin J. Teska
Assistant Examiner—Tyrone V. Walker
Attorney, Agent, or Firm—Nikaido, Marmelstein, Murray & Oram

[57] ABSTRACT

A system for detecting a combustion knock occurred in a combustion chamber of an internal combustion engine. The system includes a sensor for detecting vibration generated in the engine. Sensor output within a range of crankshaft angles during which no combustion occurs is averaged and amplified to determine a reference noise level. Sensor output within another range of crankshaft angles during which combustion occurs is compared with the reference noise level and if the sensor output exceeds the reference noise level, a combustion knock is determined to be present. In the system, a traction control system (TCS) is incorporated in which the engine output torque is reduced when the driven wheel of the vehicle on which the engine is mounted is great. The reference noise level is enlarged when the TCS operates such that the mechanical vibration increased by the sudden change in the torque due to the TCS operation is prevented from being erroneously detected as the combustion knock.

15 Claims, 10 Drawing Sheets

FIG.5

| NE \ PBA | PBA01 | | PBA16 |
|---|---|---|---|
| NE20 | AG2001 | | |
| NE19 | | | |
| ⋮ | ⋮ | ⋮ | ⋮ |
| NE02 | | | |
| NE01 | AG0101 | | AG0116 |

| SLIP RATIO | TCS OPERATION LEVEL | CYLINDERS TO BE CUT OFF FROM FUEL SUPPLY | KAGTCS |
|---|---|---|---|
| 1 | TC1 | #1 | 1 |
| 2 | TC2 | #1, #2 | 2 |
| 3 | TC3 | #1, #2, #3 | 3 |
| 4 | TC4 | #1, #2, #3, #4 | 4 |
| 5 | TC5 | All cylinders (#1~#6) | 5 |

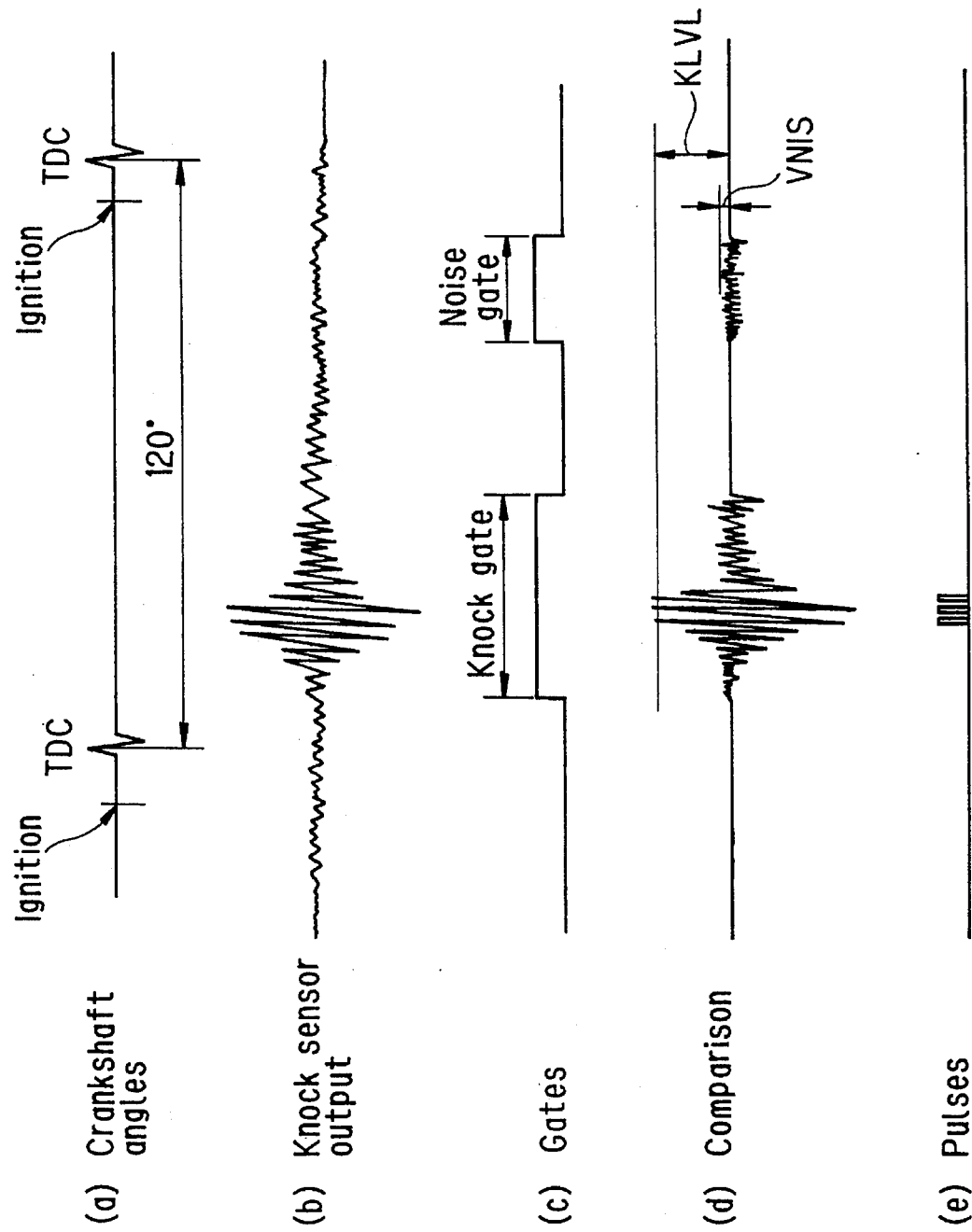

COMBUSTION KNOCK DETECTION SYSTEM FOR INTERNAL COMBUSTION ENGINE

This application is a continuation of application Ser. No. 07/981,733 filed Nov. 25, 1992, now abandoned.

BACKGROUND OF THE INVENTION

1. Field of the Invention

This invention relates to a combustion knock detection system provided in an internal combustion engine and more particularly to a combustion knock detection system provided in an internal combustion engine incorporated with the so-called traction control system.

2. Description of the Prior Art

In a conventional knock detection system proposed hitherto such as disclosed in a U.S. Pat. No. 5,165,378 by the assignee, a knock sensor is provided at an internal combustion engine to detect a combustion knock which can occur in the engine. In the known system, the vibration of the engine is detected by the sensor at a range of crankshaft angles during which no combustion occurs to determine a reference noise level. Then, the vibration of the engine detected at a second range of crankshaft angles during which combustion occurs so that knock could occur, is compared with the reference noise level. If the vibration detected at the second crank-shaft angle range is found to exceed the reference noise level, it is determined that knock occurs.

More specifically, as illustrated in FIG. 11(a), in crankshaft angles between TDC (top dead center) positions, which are 120 degrees if the engine has six cylinders, the output of the knock sensor becomes great immediately after each TDC position when a combustion occurs as illustrated in FIG. 11(b). Therefore, two gates, named a "noise gate" and a "knock gate", which are corresponding to the aforesaid first and second ranges of crankshaft angles are prepared as shown in (c) of the same figure. The sensor output in the noise gate is averaged to obtain a noise level VNIS and is then multiplied by an amplification gain (factor) AG and a coefficient K which varies with an engine coolant temperature or manifold pressure or the like, to determine the reference noise level KLVL as follows;

$$KLVL = AG \times K \times VNIS$$

Then the sensor output in the knock gate is compared with the reference noise level KLVL in a circuit which produces a pulse each time the sensor output in the knock gate exceeds the reference noise level as illustrated in FIG. 11(d) and (e). The number of pulses is then counted ("3" in the example) and if the counted values have been found to exceed a predetermined reference number, it is determined that a combustion knock occurs.

Apart from the above, recent years have seen increasing traction control systems, referred to as "TCS" hereinafter, in which the engine output torque is forcibly reduced if a driven wheel of the vehicle on which the engine is mounted is found to be slipped or spun, so as to lower the torque given to the wheel and to finally prevent the wheel from slipping or spinning excessively. The engine output torque reduction for the purpose is carried out by adjusting ignition timing in the retard direction, by adjusting an air-fuel ratio in a lean mixture or by discontinuing supply of the fuel to one or more cylinders.

In the TCS, when it operates, the ignition timing retardation or fuel cut and the like will therefore be carried out so that the mechanical vibration of the engine becomes great due to the sudden change in the engine output torque. For that reason, if a combustion knock is to be detected in the manner earlier mentioned, the knock sensor output in the knock gate will become great and there could be a possibility of erroneously detecting a combustion knock. In other words, a combustion knock could be detected although it does not exists actually, which could be a bar for a knock control.

SUMMARY OF THE INVENTION

This invention was accomplished in the light of the aforesaid problem and has its object to provide a combustion knock detection system for an internal combustion engine in which a presence/absence of a combustion knock can be detected accurately when the system is incorporated with the TCS.

For realizing the object, the present invention provides a system for detecting a combustion knock occurred in an internal combustion engine, including a knock sensor, a first device for receiving an output of the sensor detected within a range of crankshaft angles during which a combustion knock could occur, a second device for establishing a reference level, and a third device for determining occurrence of a combustion knock by comparing the output of the sensor detected within the range of crankshaft angles with the reference level. In the system, the improvement comprises a fourth device for detecting a slipping condition of a driven wheel of a vehicle on which the engine is mounted to control the slipping condition of the driven wheel and the second device changes the reference level when the fourth device controls the slipping condition of the driven wheel.

BRIEF DESCRIPTION OF THE DRAWINGS

FIG. 5 is an explanatory view showing the characteristics of a map for retrieving an amplification gain (factor) AG referred in FIG. 4 flow chart;

FIGS. 11a–11e is an explanatory timing chart for detecting occurrence of a combustion knock according to a prior art detection system.

DETAILED DESCRIPTION OF THE PREFERRED EMBODIMENTS

Embodiments of the invention will now be explained with reference to the attached drawings.

Figure 1:
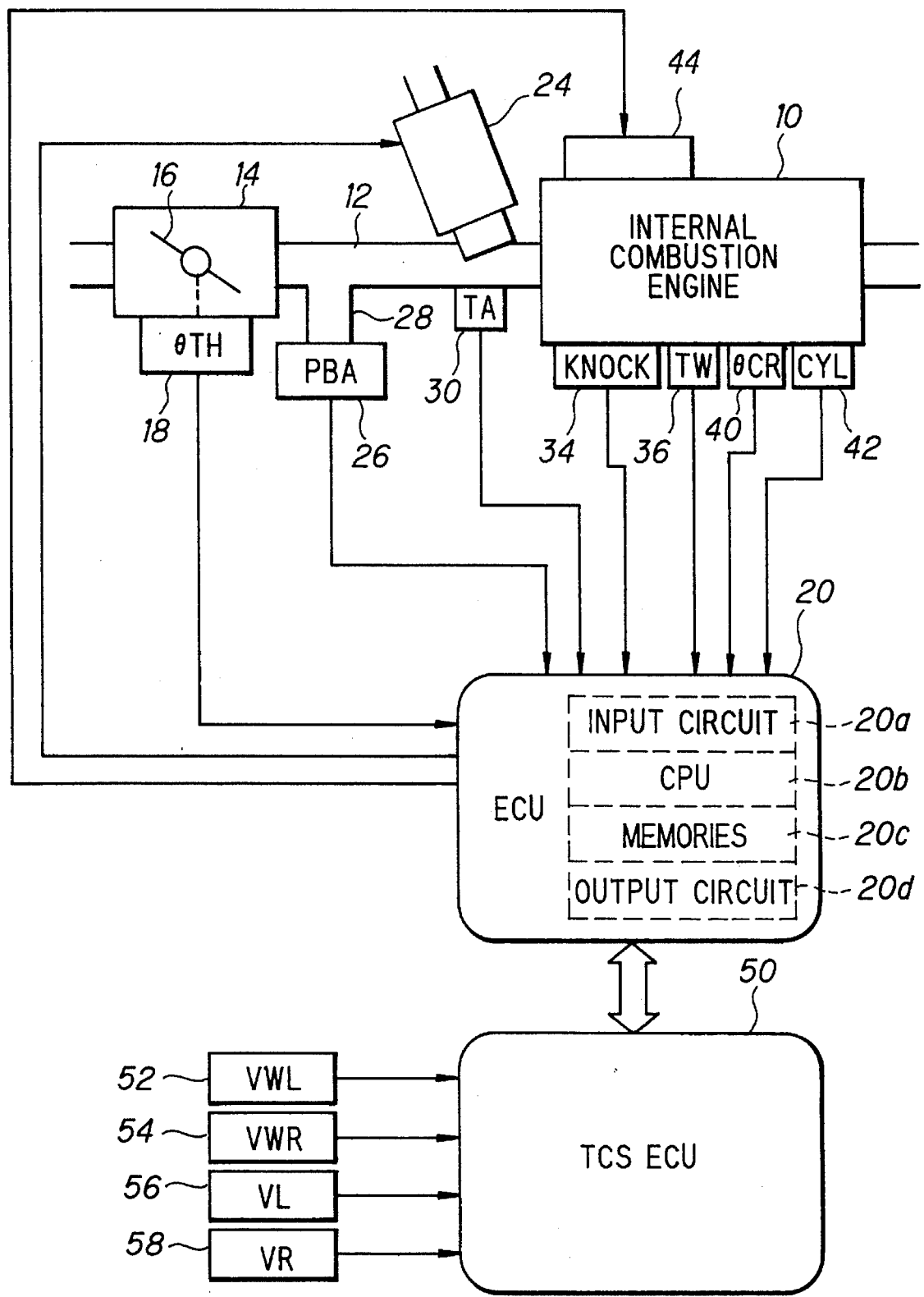
FIG. 1 is an explanatory overall view of a combustion knock detection system for an internal combustion engine including a TCS (traction control system) according to the present invention.

In FIG. 1, reference numeral 10 designates a main unit of an internal combustion engine having DOHC in-line six cylinders. In the main engine unit 10, at a middle position of an air intake passage 12, a throttle body 14 is provided, in which a throttle valve 16 is installed. The throttle valve 16 is connected with a throttle position sensor 18 which generates an electric signal indicative of the opening degree of the throttle valve θTH and forwards to an electronic control unit 20 for controlling the engine, shown as "ECU" in the figure. The ECU 20 is made up of a microcomputer comprising an input circuit 20a, a CPU 20b, a memories 20c and an output circuit 20d.

A fuel injection valve 24 is provided in the air intake passage 12 downstream of the throttle valve 16 and immediately before an intake valve, not shown, of each cylinder, not shown. The fuel injection valve 24 is connected to a fuel pump, not shown, to be supplied with fuel and is further connected, in terms of electricity, with the ECU 20 to be controlled its opening period for injection. The air intake passage (manifold) 12 is branched off down-stream of the throttle valve and a manifold absolute pressure sensor 26 is provided at the branch designated by reference numeral 28. The manifold absolute pressure sensor 26 generates an electric signal indicative of a manifold absolute pressure PBA and sends it to the ECU 20. And, a manifold air temperature sensor 30 is provided in the proximity of the manifold absolute pressure sensor 26 to generate an electric signal indicative of a manifold air temperature TA and sends it the ECU 20.

A knock or detonation sensor 34 made of a piezo-electric material, is provided at a cylinder block, not shown, of the main engine unit 10 to detect an electric signal indicative of vibration KNOCK of the engine main unit 10 and sends it to the ECU 20. A coolant temperature sensor 36 is mounted in a water-filled jacket, not shown, in the cylinder block of the main engine unit 10 to generate and sends an electric signal indicative of a coolant temperature TW of the engine to the ECU 20.

A crankshaft sensor 40 is provided at a crank-shaft, not shown, to generate a pulse signal θCR once every predetermined crankshaft angle degrees including the TDC position and send it to the ECU 20 in which the signal is counted to detect an engine speed NE. Similar sensor 42 is provided to generate a pulse signal CYL once 720 crankshaft angles which is also sent to the ECU 20 to be used for identifying the position of each six cylinders. Each six cylinders is equipped with a spark plug 44 which is connected to the ECU 20 via an ignition system, not shown, and to be controlled its ignition timing.

Based on the outputs of the sensors, the ECU 20 determines the opening period of the fuel injection valve 24 and ignition timing of the engine. If a combustion knock is detected, the ECU 20 retards the ignition timing and then advances it when the combustion knock is ceased.

Reference numeral 50 designates another electronic control unit, referred to as "TCS ECU", which has wheel speed sensors 52, 54 for detecting speed VWL, VWR of a pair of driven wheels, not shown, and another pair of wheel speed sensors 56, 58 for detecting speed VL, VR of a pair of non-driven wheels, not shown. The TCS ECU 50 is also made up of a microcomputer and detects the slipping or spinning condition of the driven wheels in a manner described just below so as to determine if the engine output torque should be reduced. The TCS ECU 50 is connected with the first ECU 20 via a communication line and if the TCS ECU 50 determines the engine output torque reduction, the first ECU 20 carries out the reduction by retarding ignition timing and the like as aforementioned.

Figure 2:
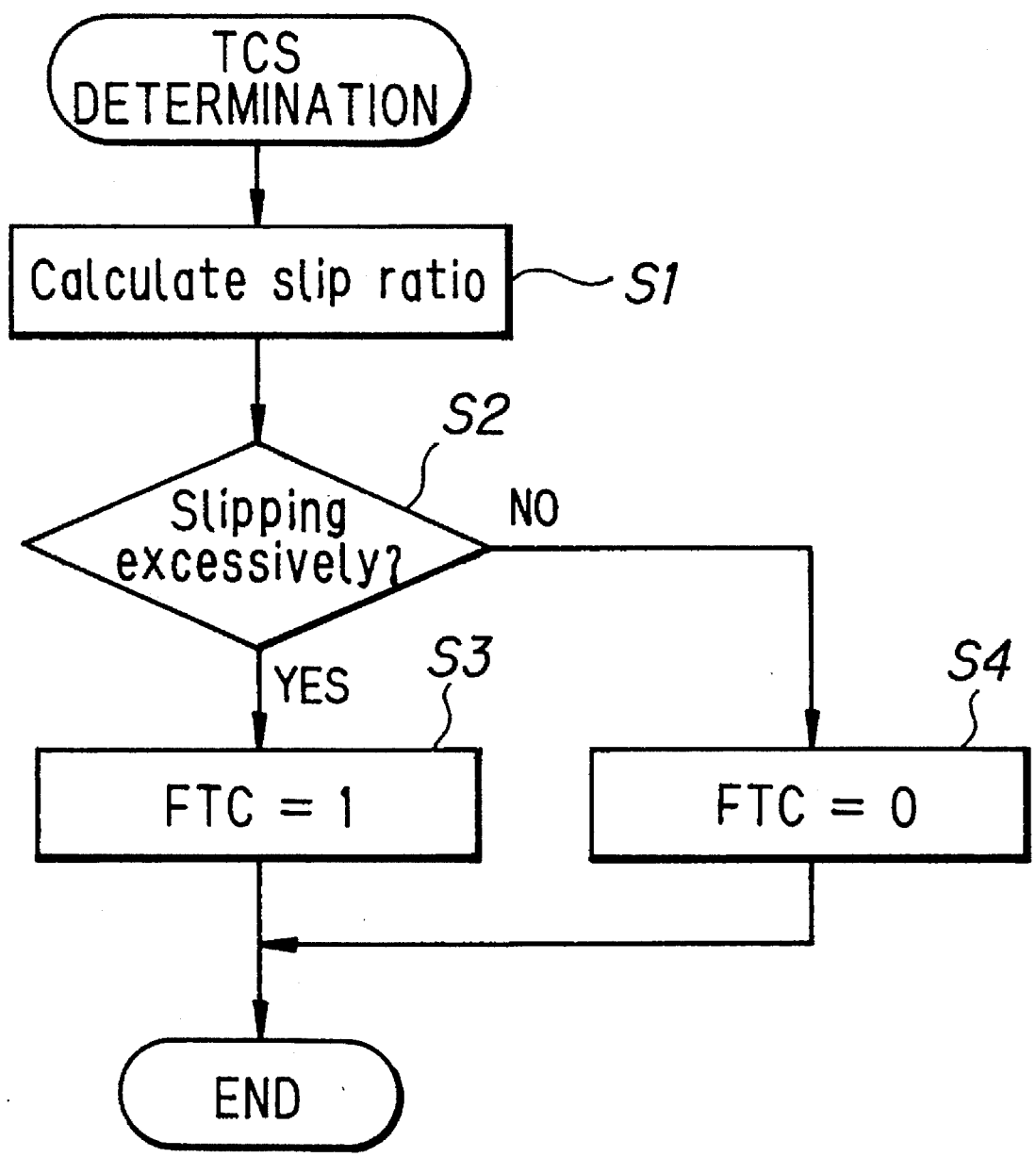
FIG. 2 is a flow chart showing the operation of the TCS shown in FIG. 1 for determining if the traction control should be carried out.

FIG. 2 is a flow chart showing the operation of the TCS ECU 50 to determine if the engine output torque should be reduced. The program is started at each TDC position.

The procedure begins with the first step S1 in which a slip ratio of the driven wheel is first calculated in accordance with an equation shown below using the left (or right) driven wheel speed and the left (or right) non-driven wheel speed:

$$\text{Slip ratio} = \frac{(VWL \text{ or } VWR) - (VL \text{ or } VR)}{(VWL \text{ or } VWR)}$$

Control next passes to step S2 in which the calculated slip ratio is compared with a predetermined reference value so as to determine if the driven wheel slippage is excessive. If the calculated slip ratio is found to exceed the reference value so that the determination is affirmative, control passes to step S3 in which a bit flag TCS is set to one which indicates the engine output torque reduction should be carried out and if the flag is set, the first ECU 20 adjusts the air-fuel ratio in the lean direction, or adjusts ignition timing in the retard direction or discontinues fuel supply to one or more cylinders. Otherwise, control passes to step S4 in which the bit flag is set to zero and no engine output torque reduction is carried out in the first ECU 20.

Figure 3:
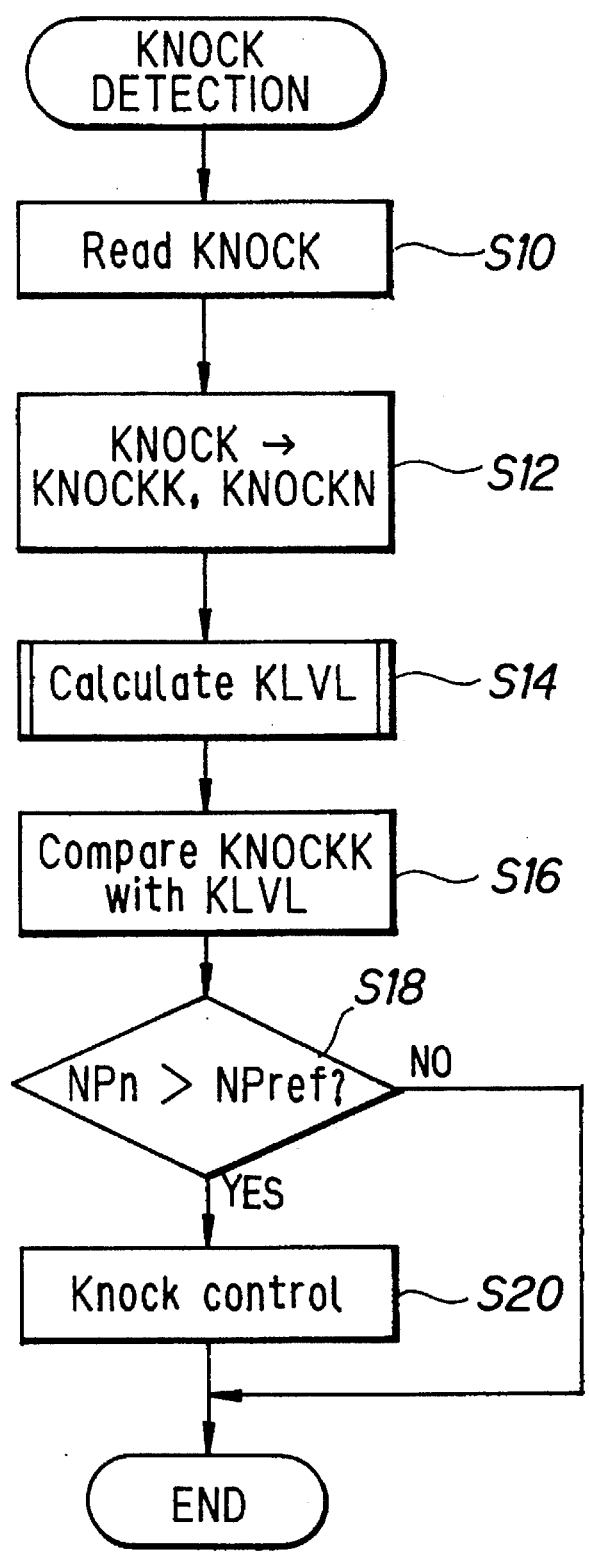
FIG. 3 is a flow chart showing a main routine of the combustion knock detection system shown in FIG. 1.

FIG. 3 is a flow chart showing the main routine of the operation of the combustion knock detection system according to the invention. The program is started at each TDC position.

The procedure begins with step S10 in which the output KNOCK of the knock sensor 34 in the knock gate and noise gate is successively read out. Control then advances to step S12 in which the sensor output KNOCK in the knock gate is labeled as "KNOCKK" and that in the noise gate as "KNOCKN". Next, control passes to step S14 in which a reference level KLVL is calculated.

Figure 4:
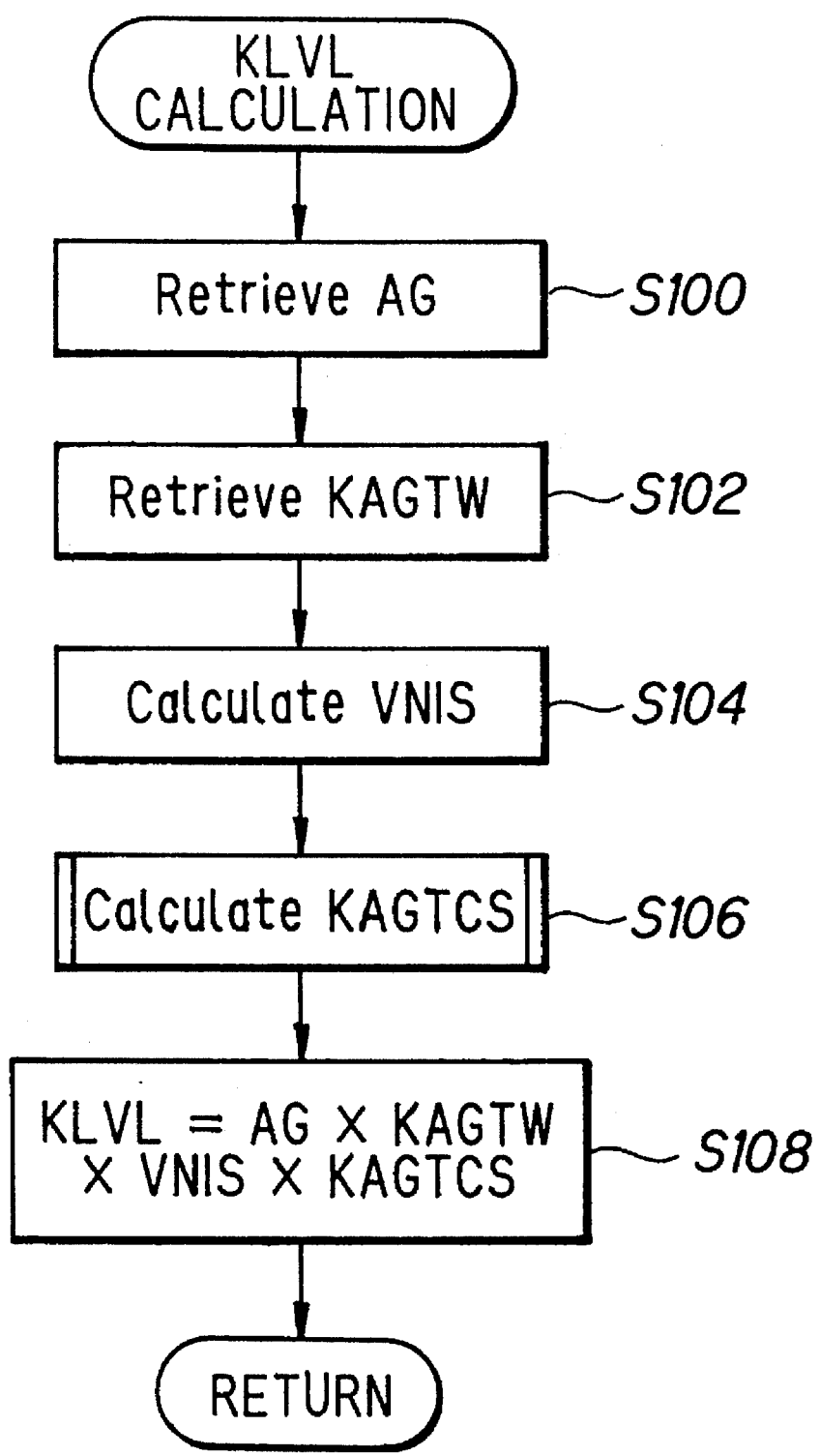
FIG. 4 is a subroutine flow chart for calculating a reference level KLVL referred in FIG. 3 flow chart.

FIG. 4 is a flow chart showing a subroutine for calculating the reference level KLVL.

At its first step S100, an amplifier gain (factor) called "AG" is determined by retrieving a map using an engine speed NE and a manifold absolute pressure PBA as address data. FIG. 5 illustrates the characteristics of the map.

Figure 6:
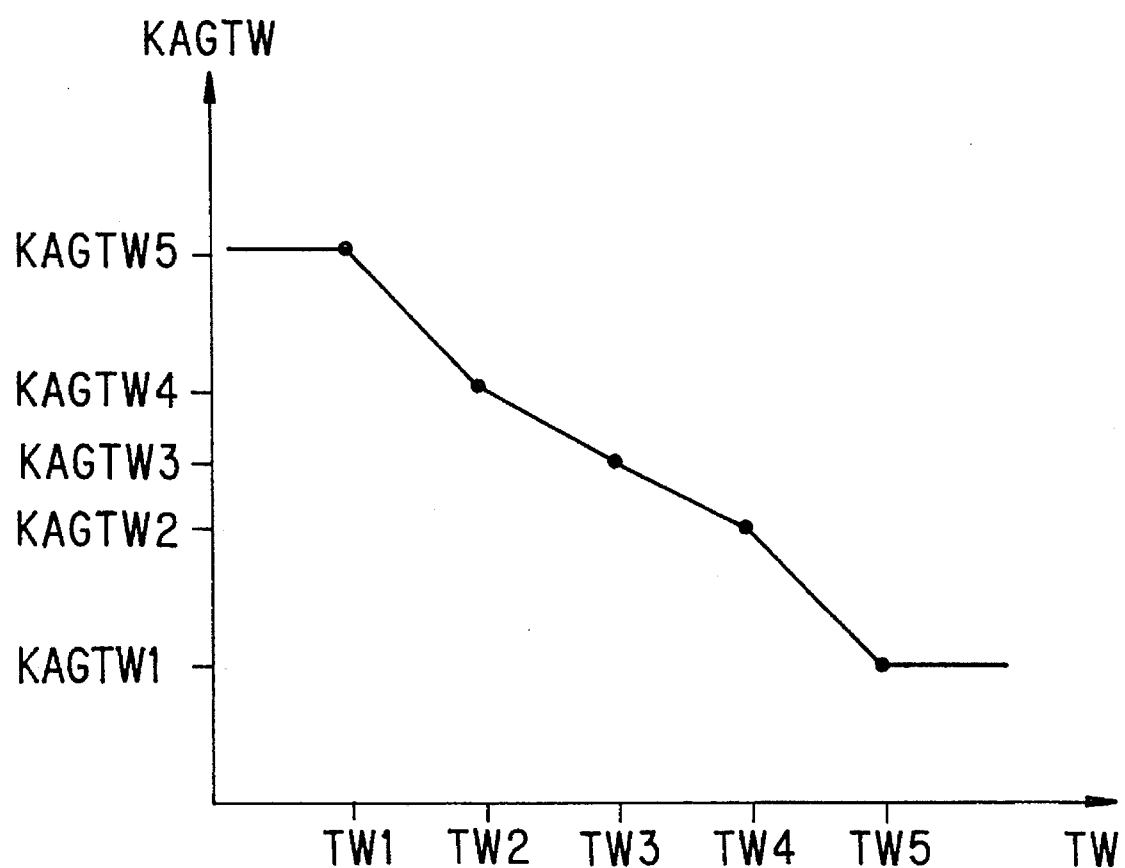
FIG. 6 is an explanatory view showing the characteristics of a table for retrieving a coefficient KAGTW referred in FIG. 4 flow chart.

Control then moves to step S102 in which a correction coefficient for the amplifier gain KAGTW is determined by retrieving a table using a coolant temperature TW as address datum. FIG. 6 illustrates the characteristics of the table. As illustrated in FIG. 6, the correction coefficient decreases with increasing coolant temperature.

It should be noted here that the word "map" means a look-up table(s) to be retrieved by two parameters and the word "table" means a look-up table to be retrieved by a single parameter. In retrieving a value either from the map or table, whichever it may be, an interpolation is used if needed.

Returning to FIG. 4, control next passes to step S104 in which the noise level VNIS is determined. This is carried out by averaging the sensor output KNOCKN detected in the noise gate using a low pass filter having a predetermined time constant.

Control then passes to step S106 in which another correction coefficient KAGTCS for the amplifier gain is calculated.

Figure 7:
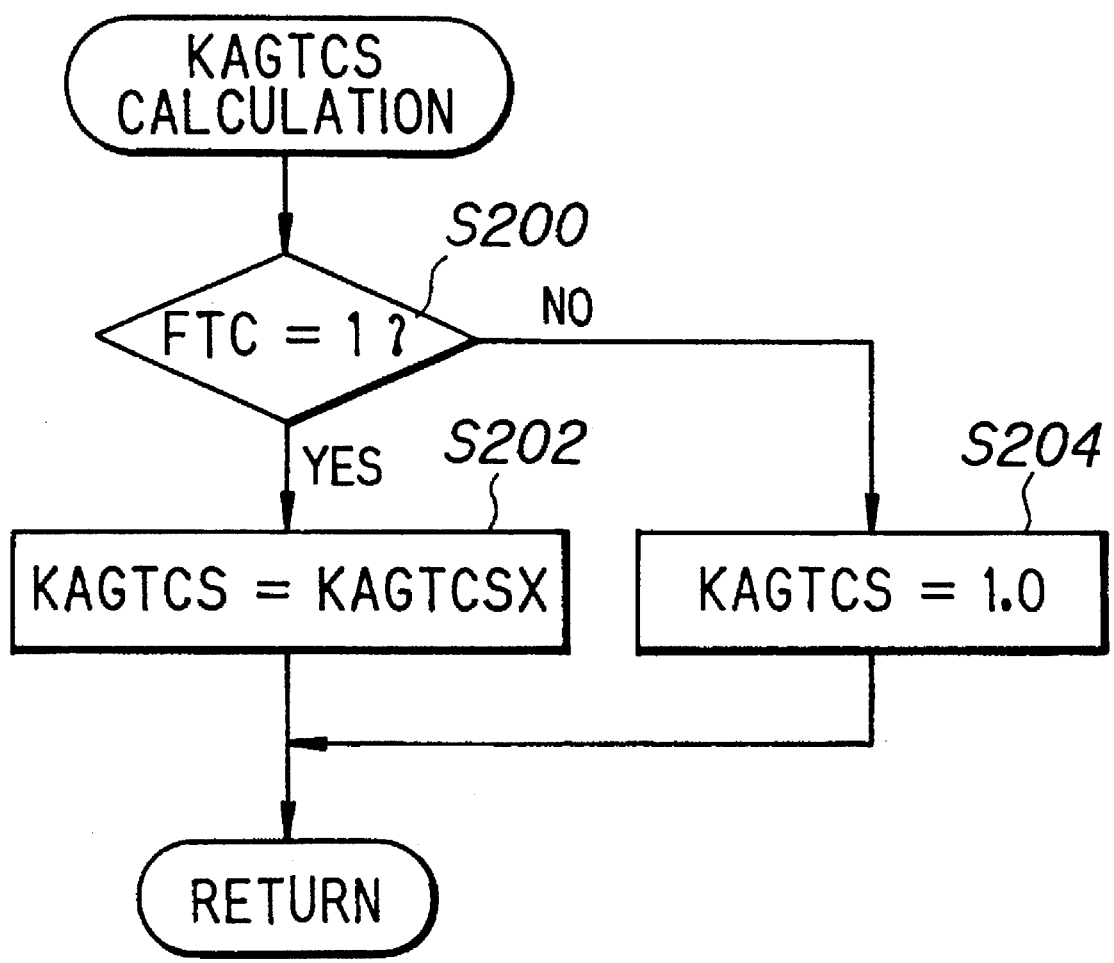
FIG. 7 is a subroutine flow chart for calculating a coefficient KAGTCS referred in FIG. 4 flow chart.

FIG. 7 is a flow chart showing a subroutine for calculating the coefficient KAGTCS.

First in step S200, it is checked if the bit of the aforesaid flag FTC is one, i.e., the TCS operation is being carried out. If the answer is affirmative, control passes to step S202 in which the coefficient KAGTCS is determined to be a predetermined value KAGTCSX (1.5 for example). If the answer at step S200 is negative, control passes to step S204 in which the coefficient is determined to be 1.0, which means no correction is made.

Returning to FIG. 4, control passes to the final step S108 in which the reference level KLVL is determined by multiplying the noise level with the gain and the coefficients as illustrated.

Again returning to FIG. 3, control passes to step S16 in which the sensor output KNOCKK detected in the knock gate is compared with the reference level KLVL to determine the number of times (the knock pulses) NPn at which the sensor output KNOCKK exceeds the reference value KLVL.

Control then advances to step S18 in which the determined number NPn is compared with a reference value NPref (one for example). If the determined number NPn is found to exceed the reference value NPref, control passes to step S20 in which a knock control is carried out in an appropriate manner such as by retarding ignition timing. Alternatively if the determined number NPn is found, at step S18, to be less than the reference value NPrer, the program is immediately terminated.

With the arrangement, since the reference level KLVL is enlarged when the TCS operates, it can prevent the louder noise generated in the knock gate due to the sudden change in the engine output torque by the TCS operation from being detected as the occurrence of a combustion knock. The detection accuracy is enhanced and a knock control can be made in an appropriate manner.

Figure 8:
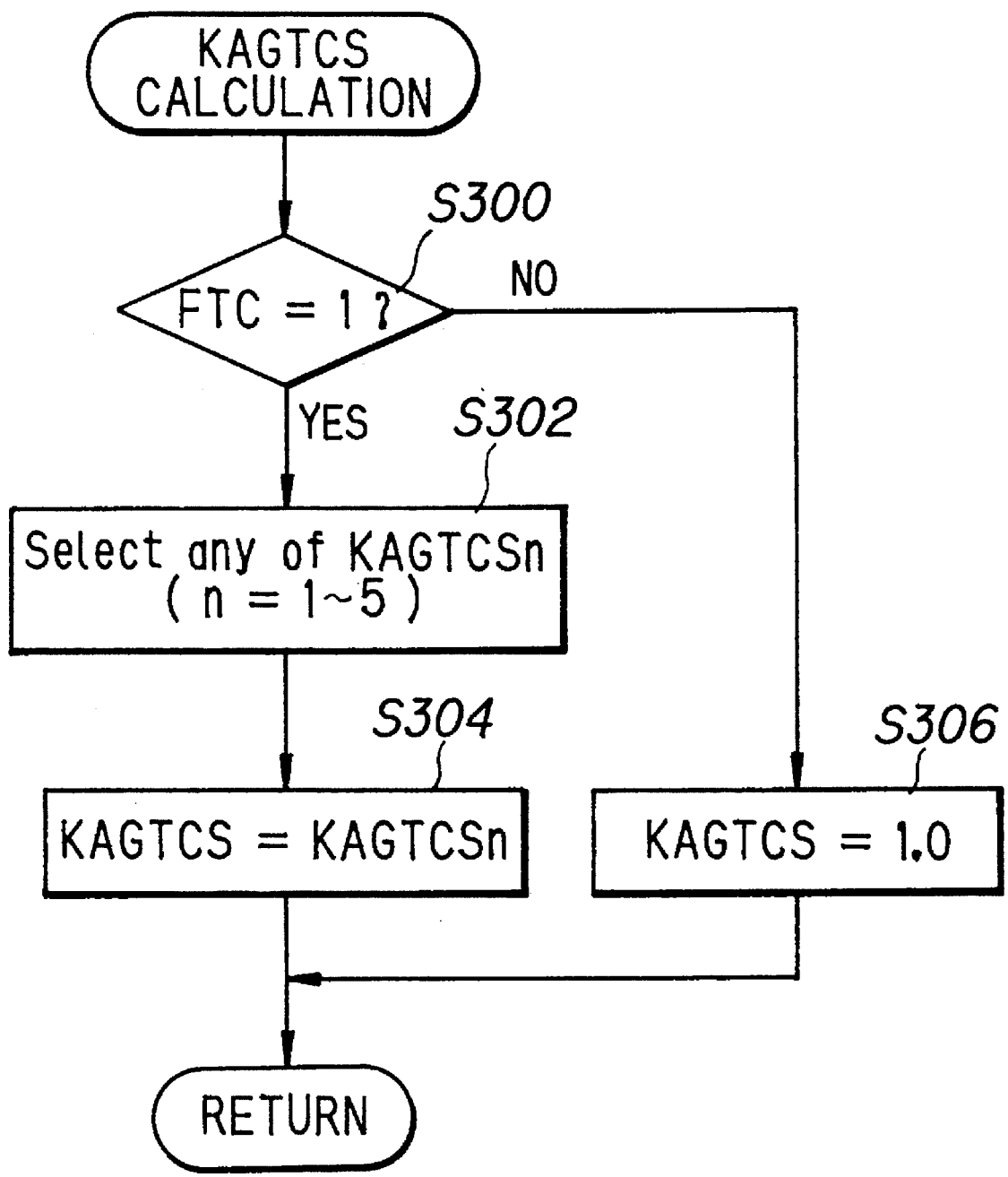
FIG. 8 is a subroutine flow chart, similar to FIG. 7, but showing a second embodiment of the present invention.

FIG. 8 is a flow chart, similar to FIG. 7, but showing a subroutine for calculating the correction coefficient KAGTCS according to a second embodiment of the present invention.

In the flow chart, when it is confirmed at step S300 that the bit of the flag FTC is set to one, control passes to step S302 in which the coefficient KAGTCS1-5 is selected in response to the TCS operation level. To be more specific, as illustrated in a tabular graph in FIG. 9, five TCS operation levels TC1 to TC5 are predetermined, in response to the slip ratio 1 to 5 of the driven wheel. In the second embodiment, the engine output torque reduction is carried out by cutting fuel supply to a cylinder(s). That is; if the slip factor is small, i.e. "1", the TCS operation level is small (TC1) so that the fuel cut is carried out only for a single cylinder. The number of cylinders to be cut off from the fuel supply will increasing with increasing slip factor and hence with increasing TCS operation level. At its maximum (TC5), the whole six cylinders are cut off from the fuel supply.

Thus, in response to the TCS operation level determined, any of the coefficient KAGTCS1-5 corresponding thereto is selected at step S302. Then control passes to step S304 in which the selected coefficient is treated as the current coefficient KAGTCS. On the other hand, if the bit of the flag FTC is found to be zero at step S300, control passes to step S306 in which the coefficient is set to be 1.0.

Figures 9, 10:
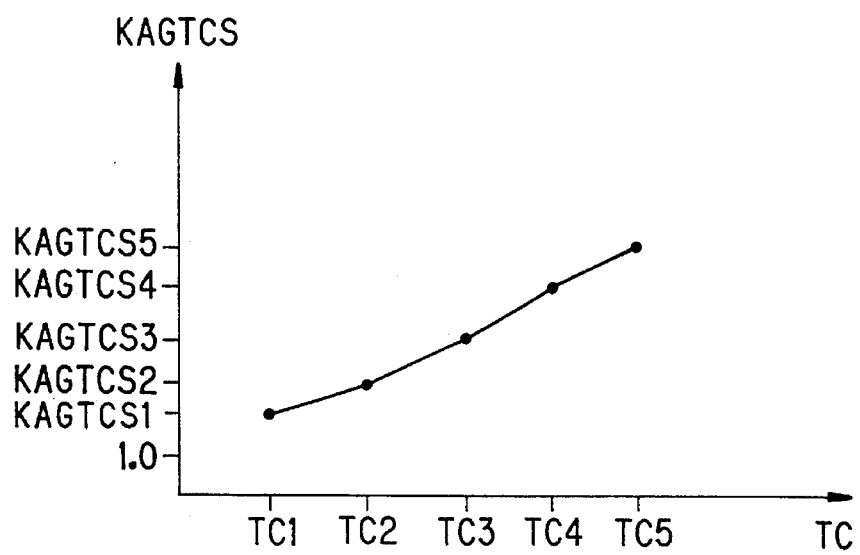
FIG. 9 is a tabular graph showing values KAGTCSn referred in FIG. 8 flow chart.
FIG. 10 is a graph showing the characteristics of the values KAGTCSn referred in FIG. 8 flow chart.

With the arrangement, as illustrated in FIG. 10, the coefficient increases with increasing TCS operation level. As a result, the reference level KLVL becomes higher as the amount of the engine output torque reduction increases. The occurrence of a combustion knock can therefore be detected more precisely so that a knock control can be carried out more appropriately.

In the second embodiment, although the engine output torque is reduced stepwise by the fuel cut in response to the slip ratio, it can alternatively be possible to reduce the torque also stepwise or gradually by adjusting the ignition timing or an air-fuel ratio of the engine as earlier mentioned.

In the first and second embodiments, it should be noted, since the characteristic feature of the present invention resides in a combustion knock detection system per se, the knock control, if a combustion knock is detected in the manner disclosed, can be carried in any appropriate manner.

Further, although the reference level KLVL is enlarged in the first and second embodiment by enlarging the coefficient KAGTCS for the amplification gain, it should be noted that the reference value can be enlarged in various ways such as by immediately multiplying a coefficient to the reference level or the noise level.

Furthermore, although the knock sensor used in the first and second embodiments is the one which detects the vibration generated in the engine, other type of detonation sensors, for example, one for detecting combustion pressure or sound wave and the like can be used.

The present invention has thus been shown and described with reference to the specific embodiments. However, it should be noted that the present invention is in no way limited to the details of the described arrangements, but changes and modifications may be made without departing from the scope of the appended claims.

What is claimed is:

1. A system, for detecting a combustion knock occurring in an internal combustion engine, said system comprising:

a knock sensor;

first means for receiving an output of the knock sensor detected within a first range of crankshaft angles during which a combustion knock could occur;

second means for establishing a reference level;

third means for determining occurrence of a combustion knock by comparing the output of the knock sensor detected within the first range of crankshaft angles with the reference level; and fourth means for detecting a slipping condition of a driven wheel of a vehicle on which the engine is mounted by calculating a ratio between a driven wheel speed and a non-driven wheel speed and for controlling the slipping condition of the driven wheel in response to the calculated ratio, and wherein when said fourth means controls the slipping condition of the driven wheel a) said second means for raising the reference level in response to the calculated ratio and b) said third means for determining combustion knock by comparing the output of the knock sensor, detected within the first range of crankshaft angles, with the raised reference level.

2. A system according to claim 1, wherein said second means includes:

fifth means for receiving an output of the knock sensor detected within a second range of crankshaft angles during which no combustion knock could occur;

sixth means for amplifying the output of the knock sensor by a predetermined amplification factor to establish the reference level; and seventh means for increasing the amplification factor when said fourth means controls the slipping condition of the driven wheel.

3. A system according to claim 2, wherein said fourth means controls the slipping condition of the driven wheel if the calculated ratio is found to exceed a predetermined value, and said seventh means increases the amplification factor when said fourth means controls the slipping condition of the driven wheel.

4. A system according to claim 1, wherein said second means includes:

fifth means for receiving an output of the knock sensor detected within a second range of crankshaft angles during which no combustion knock could occur;

sixth means for amplifying the output of the knock sensor by a predetermined amplification factor to establish the reference level; and seventh means for increasing the amplification factor in response to the calculated ratio when said fourth means controls the slipping condition of the driven wheel.

5. A system according to claim 4, wherein a plurality of control amounts are preestablished and said fourth means selects one among the control amounts in response to the calculated ratio, and said seventh means increases the amplification factor in response to the selected control amount.

6. A system according to claim 1, wherein said second means raises the reference level by increasing a coefficient to be multiplied to the reference level.

7. A system, for detecting a combustion knock occurring in an internal combustion engine, said system comprising:

a knock sensor;

first means for receiving a first output of the knock sensor detected within a first range of crankshaft angles and for amplifying the output of the knock sensor by a predetermined amplification factor to determine a reference value;

second means for receiving a second output of the knock sensor detected within a second range of crankshaft angles to compare the second output by the reference value;

third means for determining occurrence of a combustion knock if the second output of the knock sensor detected within the second crankshaft angle range is found to exceed the reference value; and fourth means for detecting a slipping condition of a driven wheel of a vehicle on which the engine is mounted by calculating a ratio between a driven wheel speed and a non-driven wheel speed to reduce engine output torque in response to the calculated ratio if the calculated ratio exceeds a reference value, wherein when said fourth means reduces the engine output torque a) said first means for enlarging the amplification factor in response to an amount of the engine output torque reduction to determine a raised reference level and b) said third means for determining occurrence of combustion knock if the second output of the knock sensor detected within the second crankshaft angle range is found to exceed the raised reference value.

8. A system according to claim 7, wherein said first means enlarges the amplification factor with increasing amount of the engine output torque reduction.

9. A system according to claim 7, wherein said first means enlarges the amplification factor by enlarging a coefficient to be multiplied to the amplification factor.

10. A system according to claim 7, wherein said first means averages the output of the knock sensor detected within the first crankshaft angle range and amplifying it by the predetermined amplification factor to determine the reference value.

11. A system according to claim 10, wherein the amplification factor varies with an engine speed and/or an engine load.

12. A system according to claim 10, wherein said first means multiplies the average value or the amplified value by a second coefficient to determine the reference value.

13. A system according to claim 12, wherein said second coefficient varies with an engine coolant temperature.

14. A system according to claim 7, wherein the first range of crankshaft angles is the crankshaft angles during which no combustion occurs.

15. A system according to claim 7, wherein the second range of crankshaft angles is the crankshaft angles during which a combustion occurs.

* * * * *